June 17, 1930.  C. C. SPREEN  1,764,653
MECHANICAL REFRIGERATION
Filed Oct. 22, 1926
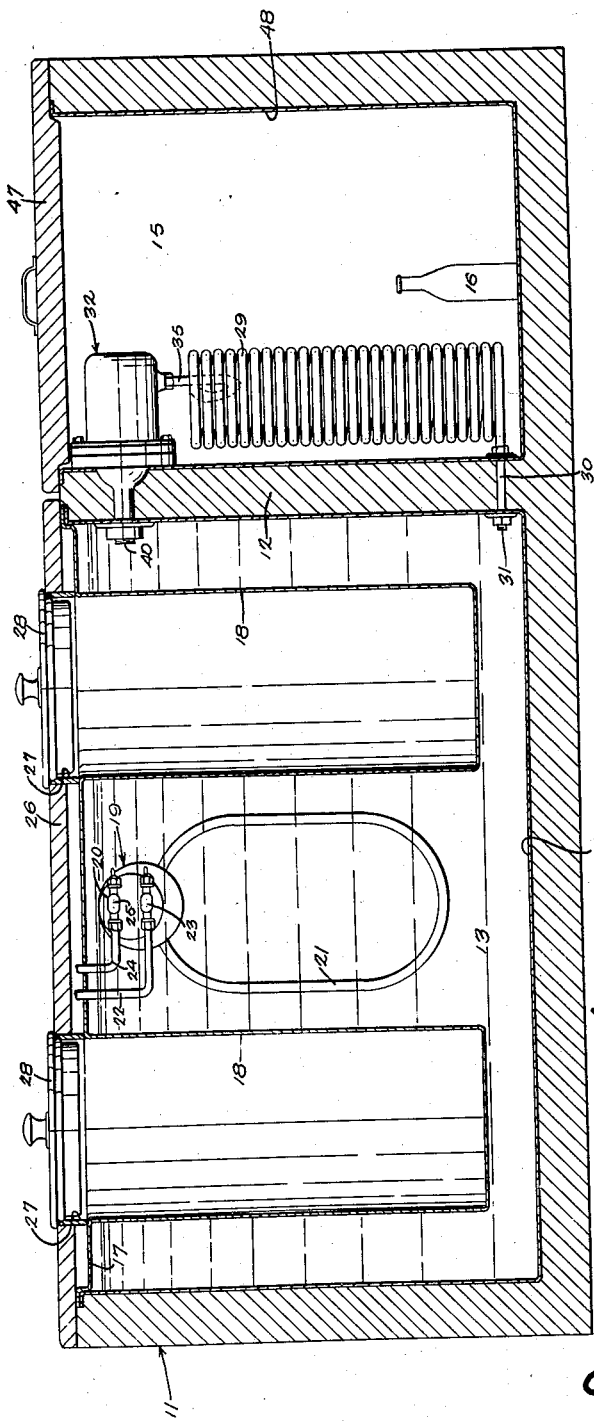
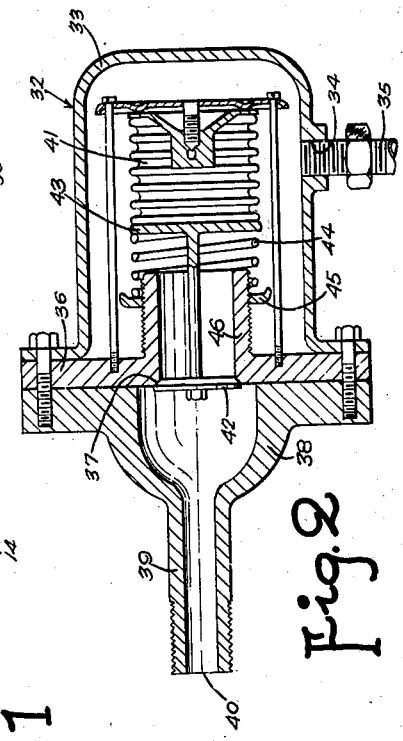
Charles C. Spreen
Inventor
by Smith and Freeman
Attorneys Patented June 17, 1930

1,764,653

UNITED STATES PATENT OFFICE

CHARLES C. SPREEN, OF DETROIT, MICHIGAN, ASSIGNOR TO KELVINATOR CORPORATION, OF DETROIT, MICHIGAN, A CORPORATION OF MICHIGAN

MECHANICAL REFRIGERATION

Application filed October 22, 1926. Serial No. 143,313.

My invention relates to mechanical refrigeration, and particularly to mechanically refrigerated cabinets for use in connection with the sale of ice cream and soft drinks, and the principal object of my invention is to provide a new and improved cabinet of this type.

In the drawings accompanying this specification and forming a part of this application I have shown, for purposes of illustration, one form which my invention may assume. In the drawings:

Figure 1 is a longitudinal vertical section taken through a cabinet constructed according to the embodiment of my invention herein disclosed, while Figure 2 is an enlarged fragmentary vertical section through the thermostatic valve shown generally in Figure 1.

The embodiment of my invention herein shown comprises a cabinet 11 divided by means of a partition 12 into an ice cream refrigerating compartment 13 containing a tank 14 arranged to contain a suitable refrigerating circulating fluid, such as brine, and a drink refrigerating compartment 15 adapted to contain bottled drinks, as illustrated at 16.

Closing the top of the tank 14 is an inner cover 17 formed with a plurality of receptacles 18 recessed into the ice cream refrigerating compartment 13 in position to be thoroughly immersed in the refrigerating circulating fluid contained within the tank 14, and each adapted to receive ice cream to be refrigerated, particularly as that ice cream is furnished in the customary cylindrical tins; also mounted within the ice cream refrigerating compartment 13 in position to be thoroughly immersed in the refrigerating circulating fluid is a refrigerant expansion apparatus 19 herein shown as of the flooded type and comprising a drum 20 provided with a plurality of looped tubes 21 depending into the refrigerating circulating fluid, receiving condensed refrigerant from any suitable source through a refrigerant supply duct 22 connected to the drum 20 through an inlet shut-off valve 23, and delivering the expanded refrigerant to any suitable compression mechanism through a delivery duct 24 connected to the drum 20 through an outlet shut-off valve 25; and closing the top of the ice cream refrigerating compartment 13 is an outer cover 26 provided with a plurality of apertures 27 alined with the receptacles 18 and adapted to be closed by means of suitable readily removable covers 28; while mounted within the drink refrigerating compartment 15 is a refrigerating coil 29 having its lower end 30 opening at 31 into the lower portion of the tank 14, and a thermostatic valve 32 comprising a casing 33 provided with an aperture 34 receiving the upper end 35 of the refrigerating coil 29, a plate 36 closing the open end of the casing 33 and provided with a valve seat 37, an outlet member 38 surrounding the valve seat 37 and provided with a tubular extension 39 extending through the partition 12 and opening at 40 into the tank 14, a bellows 41 positioned within the casing 33 responsive to the temperature of the refrigerating circulating fluid flowing through the casing 33 from the coil 29 back into the tank 14, and a valve 42 adapted to close the valve seat 37 to stop the flow of refrigerant circulating fluid through the coil 29, connected to the movable head 43 of the bellows 41 to be actuated to open position by the expansion of the bellows 41 upon increase of the temperature of the refrigerating circulating fluid within the chamber 33, and biased to closed position by means of a compression spring 44 confined between the movable head 43 of the bellows 41 and a nut 45 adjustably screw-threaded upon an annular boss 46 projecting into the casing 33 from the face of the plate 36.

From the above description it will be understood by those skilled in the art that the refrigerant expansion apparatus 19, controlled by any suitable control means, operates to maintain cool the refrigerating circulating fluid within the tank 14 to thus directly maintain cool the material within the receptacles 18, and to simultaneously refrigerate the drink refrigerating compartment 19 by flow of the refrigerating circulating fluid from the tank 14 through the refrigerating coil 29 from the opening 31 to the opening 40 under control of the thermostatic valve 32 acting automatically to control the flow of the refrigerating circulating fluid through the refrigerating coil 29 to maintain a substantially constant temperature within the drink refrigerating compartment 15.

It will also be understood that the drink refrigerating compartment 15 is provided with a suitable readily removable cover 47, that the drink refrigerating compartment 15 is preferably provided with a lining or tank 48 to permit facilitation of the refrigeration of the bottled drinks by immersion of the bottled drinks and the refrigerating coil 29 in any suitable refrigerating circulating liquid, such as water, or brine, that the receptacles 18 may be of any desired shape, and that the thermostatic valve 32 may be made responsive to any desired temperature condition, for example, directly responsible to the temperature in the drink refrigerating compartment 15.

From the above description it will be apparent to those skilled in the art that I have provided a new and improved cabinet accomplishing at least the principal object of my invention. At the same time it will also be obvious to those skilled in the art that the particular embodiment of my invention herein shown and described may be variously changed and modified without departing from the spirit of my invention or sacrificing the advantages thereof, and it will therefore be understood that the disclosure herein is illustrative only, and that my invention is not limited thereto.

I claim:

In a refrigerated cabinet having chambers separated by a partition, a brine tank in one of said chambers, refrigerant expansion means in said brine tank, a conduit extending through the lower portion of said partition for circulating brine from said brine tank through said chamber adjacent thereto, a removable housing secured to the upper portion of said partition within the chamber adjacent said brine tank, said conduit being connected in communication with said housing, conduit means extending from said brine tank to said housing, a valve in said housing for controlling the flow of brine through the outlet end thereof, and a thermostat in said housing for operating said valve, said thermostat and valve being assembled with said housing as a unitary structure.

In testimony whereof I hereunto affix my signature.

CHARLES C. SPREEN.